Patented Jan. 12, 1937

2,067,316

UNITED STATES PATENT OFFICE 2,067,316

VINYL RESIN COATING

Daniel M. Gray, Wheeling, W. Va., assignor to Hazel-Atlas Glass Company, Wheeling, W. Va., a corporation of West Virginia No Drawing. Application July 5, 1934, Serial No. 733,914

10 Claims. (Cl. 134—26)

This invention relates to polymerized vinyl resin coating materials, or lacquers, such as are used for coating sheet metal, and for similar purposes.

Polymerized vinyl resins, specifically artificial resins consisting of a mixture of polymerized vinyl acetate and polymerized vinyl chloride, are insoluble in many of the usual varnish or lacquer solvents. They are insoluble, for example, in a material known as "Varnish and paint makers' naphtha", a mixture of aliphatic hydrocarbon solvents, commonly used for varnishes and lacquers of the oleoresinous type. Some aromatic hydrocarbons—such as, benzene, toluene, xylene and commercial mixtures of these materials—are not solvents for polymerized vinyl resins, although they may soften these resins on prolonged contact. These materials cannot, therefore, be used alone as solvents for polymerized vinyl resins in coating materials and lacquers, although they may be used as diluents in conjunction with true vinyl resin solvents. Some esters—such as ethyl acetate and butyl acetate—and some ketones—such as, acetone—may be used as solvents for polymerized vinyl resins, and spraying lacquers consisting of vinyl resins and these solvents may give good results. However, in attempting to use lacquers or coatings in which these solvents are used, difficulties are encountered when the material is applied by means of a roller coating machine, as is the general practice in coating metal sheets, etc. One difficulty arises from the fact that the above-mentioned ester and ketone solvents have relatively high or rapid rates of evaporation and, accordingly, the coatings or lacquers in which they are used tend to thicken up or dry on the coating machine rolls before the lacquer or coating reaches the metal sheet or surface to be coated. In addition, all roller coating machines on applying coating material to sheet metal or similar flat surfaces leave what are termed "ridge marks" in the wet coating. These ridge marks will quickly disappear from the coating if the latter does not dry or set up too rapidly. In other words, these ridge marks are in reality portions of the material on the coated surface which are higher in elevation than the body of the coating, and on standing a reasonable time the higher portions or ridge marks tend to flow out even with the balance of the coating, producing a level and uniform film. However, if the coating dries or even "bodies up", that is, increases in viscosity, too rapidly, owing to the too rapid evaporation of the volatile solvents present, or due to other causes, these ridge marks will not entirely disappear but will persist and show on the finished sheet even after drying and baking. This ridged appearance of a dried coating is, of course, a condition much to be avoided, and is not tolerated on first class commercial metal coated work.

An object of the invention is to provide a polymerized vinyl resin coating material or lacquer, which, after having been applied to a surface and suitably dried, will not display ridge marks.

A further object is to provide such a coating material or lacquer which may be applied by suitable coating machines to metal sheets and the like, which will not thicken up on the coating machine rolls, and which will flow freely and produce a uniform coated surface on drying, and be free from irregular thick deposits.

A further object is to provide such a coating material or lacquer which possesses a sufficiently slow drying rate, that upon application to a surface, will flow to a film of uniform thickness before thickening and drying.

Other objects of the invention will be apparent to those skilled in the art upon reading the specification.

Polymerized vinyl resin coating materials, or lacquers, in the form of a dried or baked film on sheet metal or other material, have certain very desirable properties, such as high resistance to softening by alcohol or liquids containing alcohol, which makes such coatings desirable or necessary in metal containers and the like, in which the coating comes in contact with spirituous beverages; also on the inside of bottle caps; also on the ornamental trays on which these beverages are served; and also for many other purposes where the properties of vinyl resins are desirable or necessary. Experience with many vinyl resin coating materials or lacquers has, however, shown a very pronounced tendency to the permanent ridging above referred to. Among the proposed solvents for vinyl resins are methyl isobutyl ketone, and dipropyl ketone, which have a sufficiently slow evaporation rate to overcome to a considerable extent the bodying, thickening, and drying of the coating material on the rolls of the coating machine. However, even the relatively slow evaporation rates of these solvents do not overcome the tendency of vinyl resin coating materials and lacquers containing them to show permanent ridging.

After considerable research on these products, it has been found that the addition of a very small proportion of one or more hydrogenated hydrocarbons, both of aliphatic and aromatic compounds, that are compatible with vinyl resin coating materials, lacquers, or solvents thereof, such as polyhydronaphthalenes, for example, tetrahydronaphthalene, $C_{10}H_{12}$, (also called "tetralin"); dekahydronaphthalene, $C_{10}H_{18}$, (also called "dekalin"); dihydronaphthalene; hexahydronaphthalene; and octahydronaphthalene, to coating materials and lacquers made of polymerized vinyl resins, will eliminate entirely permanent ridging in coatings after drying. These polyhydronaphthalenes have high boiling points, for example, that of tetrahydronaphthalene is about 207° C.; of dekahydronaphthalene, about 195° C., (depending upon purity). This advantageous use of hydrogenated hydrocarbons, and particularly of the polyhydronaphthalenes, in coating materials and lacquers of this type to prevent ridging was discovered after considerable research, as they are not true solvents of polymerized vinyl resins, but are, nevertheless, compatible with these resins and also compatible with the solvents and diluents used in making coatings or lacquers containing polymerized vinyl resins. In this respect, this special group of polyhydronaphthalenes is unique, since many other high boiling hydrocarbons do not give similar results due to the fact that they are not only not solvents of vinyl resin, but, in addition, are not compatible therewith, as are the members of the polyhydronaphthalene group above noted. There are, of course, high boiling solvents or plasticizers for polymerized vinyl resins—such as dibutyl phthalates, tricresyl phosphate, etc.—but, if used in vinyl resin coating or lacquer in sufficient amounts to overcome the ridging or flow marks incident to application to sheet metal by means of a roller coating machine, tend to remain in the baked and dried film and have the effect of plasticizing or softening this film beyond the point which is considered necessary and desirable.

In the preparation of satisfactory polymerized vinyl resin coating materials or lacquers of the type covered by this invention, efficient vinyl resin solvents such as described above, including methyl isobutyl ketone, together with such compatible non-solvent diluents as toluene, and dipentene, plus the addition of a small amount of a polyhydronaphthalene, for example tetrahydronaphthalene, which latter functions as a leveling agent, or an agent which prevents permanent ridging of the coating film, are thoroughly blended by methods well known in this art.

I have found, for example, that, in a polymerized vinyl resin lacquer containing approximately twenty percent of vinyl resin, the balance consisting largely of methyl isobutyl ketone, toluene, and dipentene, which mixture will show permanent ridging when applied by the conventional roller coating machines, that the addition of as little as four ounces of single or mixed polyhydronaphthalene to a gallon of lacquer will practically overcome all permanent ridging. I have also used effective amounts depending on the service required, of tetrahydronaphthalene, varying from less than four ounces to twelve ounces per gallon of lacquer, which is, in other words, an amount of tetrahydronaphthalene equal to approximately two percent to twelve percent of the lacquer. When amounts of tetrahydronaphthalene in excess of ten percent are used, increased care and higher temperatures may be required to secure proper drying of the film.

The following formulae are typical of vinyl resins in lacquers in which polyhydronaphthalenes are used, and show the variations in the amounts thereof and associated compounds which can be used:

*Example I*

| | Parts by weight |
|---|---|
| Polymerized vinyl resin | 18 |
| Methyl isobutyl ketone | 60 |
| Toluene | 20 |
| Tetrahydronaphthalene | 2 |

*Example II*

| | Parts by weight |
|---|---|
| Polymerized vinyl resin | 20 |
| Methyl isobutyl ketone | 40 |
| Dipropyl ketone | 20 |
| Toluene | 10 |
| Tetrahydronaphthalene | 6 |
| Dekahydronaphthalene | 4 |

*Example III*

| | Parts by weight |
|---|---|
| Polymerized vinyl resin | 20 |
| Methyl isobutyl ketone | 30 |
| Dipropyl ketone | 10 |
| Toluene | 25 |
| Dipentene | 10 |
| Tetrahydronaphthalene | 5 |

The above examples are intended as illustrations of compositions that effectively prevent permanent ridging. Many similar compositions may be prepared with the components in different percentages, using any of the compatible hydrogenated hydrocarbons referred to herein, that will also prevent permanent ridging.

What I claim is:

1. A polymerized vinyl resin coating material or lacquer, comprising polymerized vinyl resin, a solvent in which said resin is dissolved, a diluent therefor, and at least one member of the group of polyhydronaphthalenes compatible with and mixed with the liquid mass and in such amounts as impart to said liquid mass when applied as a coating the property of drying without forming permanent ridges, the said group of polyhydronaphthalenes consisting of tetrahydronaphthalene, dekahydronaphthalene, dihydronaphthalene, hexahydronaphthalene, and octahydronaphthalene.

2. A polymerized vinyl resin coating material or lacquer, comprising polymerized vinyl resin, a solvent in which said resin is dissolved, a diluent therefor, and from about two percent to about twelve percent of at least one member of the group of polyhydronaphthalenes compatible with and mixed with the liquid mass and in such amounts as impart to said liquid mass when applied as a coating the property of drying without forming permanent ridges, the said group of polyhydronaphthalenes consisting of tetrahydronaphthalene, dekahydronaphthalene, dihydronaphthalene, hexahydronaphthalene, and octahydronaphthalene.

3. A polymerized vinyl resin coating material or lacquer, comprising polymerized vinyl resin, a solvent in which said resin is dissolved, a diluent therefor, and tetrahydronaphthalene mixed with the liquid mass and in such amounts as impart to said liquid mass when applied as a coating the property of drying without forming permanent ridges.

4. A polymerized vinyl resin coating material or lacquer, comprising polymerized vinyl resin, a solvent in which said resin is dissolved, a diluent therefor, and dekahydronaphthalene mixed with the liquid mass and in such amounts as impart to said liquid mass when applied as a coating the property of drying without forming permanent ridges.

5. A polymerized vinyl resin coating material or lacquer, comprising polymerized vinyl resin, a solvent in which said resin is dissolved, a diluent therefor, and tetrahydronaphthalene and dekahydronaphthalene mixed with the liquid mass and in such amounts as impart to said liquid mass when applied as a coating the property of drying without forming permanent ridges.

6. A polymerized vinyl resin coating material or lacquer, comprising

|  | Parts by weight |
|---|---|
| Polymerized vinyl resin | about 18 |
| Solvent | do 60 |
| Diluent | do 20 |
| Tetrahydronaphthalene | do 2 |

7. A polymerized vinyl resin coating material or lacquer, comprising

|  | Parts by weight |
|---|---|
| Polymerized vinyl resin | about 18 |
| Methyl isobutyl ketone | do 60 |
| Toluene | do 20 |
| Tetrahydronaphthalene | do 2 |

8. A polymerized vinyl resin coating material or lacquer, comprising

|  | Parts by weight |
|---|---|
| Polymerized vinyl resin | about 20 |
| Methyl isobutyl ketone | do 40 |
| Dipropyl ketone | do 20 |
| Toluene | do 10 |
| Tetrahydronaphthalene | do 6 |
| Dekahydronaphthalene | do 4 |

9. A polymerized vinyl resin coating material, or lacquer, comprising

|  | Parts by weight |
|---|---|
| Polymerized vinyl resin | about 20 |
| Methyl isobutyl ketone | do 30 |
| Dipropyl ketone | do 10 |
| Toluene | do 25 |
| Dipentene | do 10 |
| Tetrahydronaphthalene | do 5 |

10. A polymerized vinyl resin coating material or lacquer, comprising polymerized vinyl resin, a solvent in which said resin is dissolved, and tetrahydronaphthalene mixed with the liquid mass and in such amounts as impart to said liquid mass when applied as a coating the property of drying without forming permanent ridges.

DANIEL M. GRAY.